(12) United States Patent
Sonkin et al.

(10) Patent No.: US 7,822,741 B2
(45) Date of Patent: Oct. 26, 2010

(54) API FOR PROGRAMMATIC RETRIEVAL AND REPLAY OF DATABASE TRACE

(75) Inventors: Dmitry Sonkin, Redmond, WA (US); Alexander G. Balikov, Redmond, WA (US); Viatcheslav Krassovsky, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1468 days.

(21) Appl. No.: 10/872,633

(22) Filed: Jun. 21, 2004

(65) Prior Publication Data

US 2005/0283457 A1 Dec. 22, 2005

(51) Int. Cl.
G06F 7/00 (2006.01)
G06F 17/30 (2006.01)
(52) U.S. Cl. ...................................... 707/718
(58) Field of Classification Search ................ 707/202, 707/102; 717/4, 139; 714/37–39
See application file for complete search history.

(56) References Cited

U.S. PATENT DOCUMENTS

| 5,745,750 | A * | 4/1998 | Porcaro ..................... 707/102 |
| 6,145,121 | A * | 11/2000 | Levy et al. ................. 717/135 |
| 6,708,293 | B2 | 3/2004 | Kaler et al. ................ 714/39 |
| 7,039,644 | B2 * | 5/2006 | Hind et al. ................. 707/101 |
| 7,107,150 | B2 * | 9/2006 | Iwamura et al. ............ 701/208 |
| 2002/0104002 | A1 * | 8/2002 | Nishizawa et al. ......... 713/168 |
| 2003/0140280 | A1 | 7/2003 | Kaler et al. ................ 714/37 |
| 2005/0198081 | A1 * | 9/2005 | Albert et al. ............... 707/202 |

FOREIGN PATENT DOCUMENTS

WO WO 2004/051472 6/2004

OTHER PUBLICATIONS

Anzimirov, L.V. et al., "Trace Mode Technologies for Large-Scale Process Control Systems," *Pribori i Sistemi Uprablenie, Kontrol, Diagnostikia* (Russia), 2001, 1, 2-7 (Abstract only enclosed).

(Continued)

*Primary Examiner*—Sathyanarayan Pannala
(74) *Attorney, Agent, or Firm*—Woodcock Washburn LLP

(57) ABSTRACT

Trace and replay objects can be designed to automatically perform operations concerning database trace data upon invocation by custom computer processes. Trace data can be saved to any of variety of locations. It can be manipulated for the purpose of storage or replay. Trace data can be played back against any database server using numerous replay configuration options. Replay notifications allow data to be changed just before it is submitted to a database for execution, and allow immediate examination of replay results and validation of playback correctness. Thus, trace and replay objects greatly simplify manageability of trace data. Custom processes can now completely automate security audit and health monitoring of traced database servers. Automatic verification of new server releases and security packs can also be performed. Custom processes can use the provided objects to flexibly access and manipulate the retrieval, storage, and replay of database trace data.

12 Claims, 12 Drawing Sheets

OTHER PUBLICATIONS

Bohannon, P. et al., "Detection and Recovery Techniques for Database Corruption," *IEEE on Trans. on Knowledge and Data Engineering*, 2003, 15(5), 1120-1136.

Gills, M. et al., "Extended use of a traceability tool within software development project," *Databases and Information Systems II. Proceedings of the Fifth International Baltic Conference*, Tallinn, Estonia, Jun. 3-6, 2002, 175-186.

Mallet, S. et al., "Myrtle: a set-oriented meta-interpreter driven by a "relational" trace for deductive databases debugging," *Proceedings of Logic-Based Program Synthesis and Transformation. 8th International Workshop*, Manchester, UK, Jun. 15-19, 1998, 328-331.

Pietrek, M., "Under the Hood: The .NET Profiling API and the DNProfiler Tool," *MSDN Magazine*, Dec. 2001, 8 pages.

Wang, W., "A Self-Tuning Page Cleaner for DB2," *Proceedings 10th IEEE International Symposium on Modeling, Analysis, and Simulation of Computer and Telecommunications Systems*, Fort Worth, TX, Oct. 11-16, 2002, 81-89.

\* cited by examiner

```
public class TraceReplay
{
        bool Start();

bool Pause();

bool Stop();

event ReplayNotifyDelegate ReplayNotify;

event ReplayOutputNotifyDelegate ReplayOutputNotify;

event ReplayPauseDelegate ReplayStartNotify;

event ReplayPauseDelegate ReplayPauseNotify;

event ReplayStopDelegate ReplayStopNotify;

TraceReaderWriter Source{ get; set; }

TraceReaderWriter Output{ get; set; }

ConnectionInfoBase Connection { get; set; }

TraceReplayOptions Options{ get; set; }
}
```

*Fig. 7*

```
public delegate void ReplayNotifyDelegate( int recordNumber,
IDataRecordChanger currentRecord, out bool skipRecord );

public delegate void ReplayOutputNotifyDelegate(
IDataRecordChanger currentRecord, out bool skipRecord );

public delegate void ReplayStartNotifyDelegate();

public delegate void ReplayPauseNotifyDelegate();

public delegate void ReplayStopNotifyDelegate();
```

*Fig. 8*

```
public interface IDataRecordChanger : IDataRecord
{
    void SetValue( int i, object value );

int AddColumn( int columnid );
}
```

Fig. 9

```
public class TraceReplayOptions
{
    // lets user control size of replay thread pool
    int NumberOfReplayThreads{ get; set; }

// controls how long is the wait before killing the hung
process
    int HealthMonitorWaitInterval{ get; set; }

// controls how frequently system polls for hung processes
    int HealthMonitorPollInterval{ get; set; }

// which mode to use for Replay
    ReplayMode Mode{ get; set; }

// do we need to bring back query results or only report
errors
    bool KeepResults{ get; set; }
}
```

Fig. 10

```
public enum ReplayMode
{
        SequentialReplay = 0,
        ConnectionLevelSync
}
```

API FOR PROGRAMMATIC RETRIEVAL AND REPLAY OF DATABASE TRACE

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright © 2004, Microsoft Corp.

FIELD OF THE INVENTION

This invention relates to computing, and more particularly to analysis of database actions and performance, and more particularly to an application programming interface that allows customized and automated retrieval and replay of trace data emitted by a database.

BACKGROUND OF THE INVENTION

A database comprises a collection of data, typically describing the activities of one or more related organizations. For example, a university database might include information about entities, such as students, faculty, courses, and classrooms, and relationships between entities, such as student enrollment in courses, faculty teaching courses, and the use of rooms for courses. A database management system, or DBMS, is software designed to assist in maintaining and utilizing large collections of data. For the purpose of this document, however, the term "database," or "database server" refers to either or both of a collection of data and DBMS software. Thus, database 100 in FIG. 1 can be considered both a collection of data and DBMS.

Many kinds of databases are in use. The first database model is widely attributed to Charles Bachman of General Electric in the early 1960's. This was called the Integrated Data Store, and followed the network data model. Later in the 1960's, IBM developed the Information Management System, which formed the basis for a hierarchical data model. In 1970, Edgar Codd of IBM proposed the relational data model, which proved to be a watershed in the development of database systems. The popularity of relational databases changed the commercial landscape. Their benefits were widely recognized, and the use of databases for managing corporate data became standard practice. Relational databases are the dominant model in use today.

Various DBMS products, e.g. MICROSOFT SQL SERVER®, IBM DB2®, ORACLE DATABASE®, and SYBASE IQ® have greatly extended the capabilities of databases. Databases can store a wide variety of data types, such as images and text, and can perform complex queries on stored data. Specialized systems have been developed by numerous vendors for creating data warehouses, consolidating data from several databases, and for carrying out specialized analysis.

Databases have entered the internet age. The use of a database to store data accessed through a web browser is widespread. Queries are generated through Web-accessible forms and answers are formatted using a markup language such as Hyper Text Markup Language (HTML) or Extensible Markup Language (XML) which can be displayed in a browser. Databases continue to gain importance as more and more data is brought online and made ever more accessible through computer networking. Today the field is being driven by exciting visions such as multimedia databases, interactive video, streaming data, digital libraries, a host of scientific projects, and corporate data consolidation and data mining. Access to databases over global computer networks is commonplace.

Referring to FIG. 1, a multitude of clients 101, 102, and 103 may request services from a database 100. Typically, the service requests 101a, 102a, and 103a are Structured Query Language (SQL) queries which ask a database for data matching certain criteria. For example, the database introduced above might be requested via service request 101a, to return a list of all students with the last name of "Smith." The database 100 may determine a strategy for the best way to process such a service request 101a, gather the appropriate data, format the gathered data, and send the data back to client 101. A modern database 100 may be asked to perform hundreds or thousands of such operations simultaneously.

In addition to retrieving data, databases may also be requested to update data. For example, if database 100 is a bank database with account information, the data will need to be updated every time there is a deposit or a withdrawal from a particular account. Another function of a database is to organize access to data to ensure that is updated in an orderly way, and to provide the most updated version of data for the multitude of requests that are made.

There is no single best way to store, update, and manage access to data. Changes in the way that data is stored can vastly improve the performance of a database. Likewise, changes in the techniques for managing data requests and updates to data can increase performance. On the other hand, such changes in data layout and access techniques can cause problems for the proper functioning of a database. Changes may lead to poor performance, inability to process certain requests, errors in the data gathered and returned, and instability of a database.

As a result, there is a need to monitor and analyze the performance of modern databases. Through understanding the conditions that cause a database to perform well, or conversely, to experience problems, databases can be improved. In response to this need, many modern databases are equipped with the ability to emit a trace data stream 104b.

A trace data stream 104b contains information about the various operations of a database 100. Such a stream 104b may contain any information that is considered relevant for analysis. In general, trace data streams 104b contain information describing the various service requests 101a, 102a, 103a that were made for a database. Such descriptions may include the request made, the time of the request, and the client that issued the request. Any output returned by the database may also be included in a trace data stream 104b. As modern databases increase the number of services they provide, an increasing variety of data is available for inclusion in a trace data stream 104b.

Typically, access to a trace data stream 104b is made through a client computer 104. The client computer 104 may send a trace data request 104a to a database 100, thereby opening a connection to the trace data stream 104b. Traditionally, a profiler application 105 is installed on the client computer 104. The profiler 105 allows a human to initiate a session through a Graphic User Interface (GUI). The profiler can display accumulated trace data in a window 108. The profiler can provide a menu of items allowing numerous functions 110 for the access and manipulation of trace data 104a. Some of these functions 110 are shown in the exemplary profiler GUI 105 in FIG. 1, such as save, open, print, replay, etc. Using this profiler application 105, a user may specify a database 100 to analyze, open a connection to the corresponding trace data stream 104b, and save the trace data collected in any number of locations, such as in a file, in a table, or on a server.

Moreover, a user can instruct a profiler 105 to replay trace data. Trace replay allows a sequence of queries represented in trace data to be generated and run on a database. Thus, if, for example, changes or improvements are made to a database that experienced problems, a human can run a set of queries against the improved database to determine if it was properly fixed.

As databases proliferate, the cost of analyzing and improving databases also increases. Keeping a running store of all trace data for a single database could be very costly, an expense that multiplies with multiple databases. Therefore it is necessary to strategically chose when to access and store trace data. If a first database experiences a particular problem, it may be desired to replay the trace corresponding to the problem against a variety of other databases. Occasionally trace data is modified prior to replay to gather additional information and potentially narrow the possible causes of a database problem. These modified traces may also be replayed against a large number of databases. Thus the collection, modification, and replay can become an expensive and cumbersome task. The traditional approach for database trace data accumulation, analysis, and replay can involve too much human time in operating a profiler application.

In light of the heretofore unforeseen difficulties in the industry set forth above, there is an unacknowledged and unfilled need for improved systems and methods for gathering and replaying trace data.

SUMMARY OF THE INVENTION

In consideration of the above-identified shortcomings of the art, the present invention provides systems and methods for programmatic retrieval and replay of database trace data. A plurality of objects—trace and replay objects—can be designed to automatically perform operations upon invocation by custom computer processes. Trace data can be saved to any of variety of locations. It can be manipulated for the purpose of storage or replay. Trace data can be played back against any database server using numerous replay configuration options. Replay notifications allow data to be changed just before it is submitted to a database for execution, and allow immediate examination of replay results and validation of playback correctness.

Trace and replay objects greatly simplify manageability of trace data from several perspectives. Designers of custom processes can now completely automate security audit and health monitoring of traced database servers. Automatic verification of new server releases and security packs can also be performed. Custom processes can use the provided objects to flexibly access and manipulate the retrieval, storage, and replay of database trace data. Such custom processes can be designed to use the invention in ways that suit the particular needs of a given organization.

Other advantages and features of the invention are described below.

BRIEF DESCRIPTION OF THE DRAWINGS

The API for programmatic retrieval and replay of database trace in accordance with the present invention are further described with reference to the accompanying drawings in which:

FIG. 7 illustrates a class definition for an exemplary replay object;

FIG. 8 illustrates exemplary declarations for callback notification events;

FIG. 9 illustrates an exemplary definition for an IDataRecordChanger interface that can inherit from an IDataRecord interface, such as the IDataRecord interface that is known in the art;

FIG. 10 illustrates an exemplary class definition for a trace replay options object;

DETAILED DESCRIPTION OF ILLUSTRATIVE EMBODIMENTS

Figure 1:
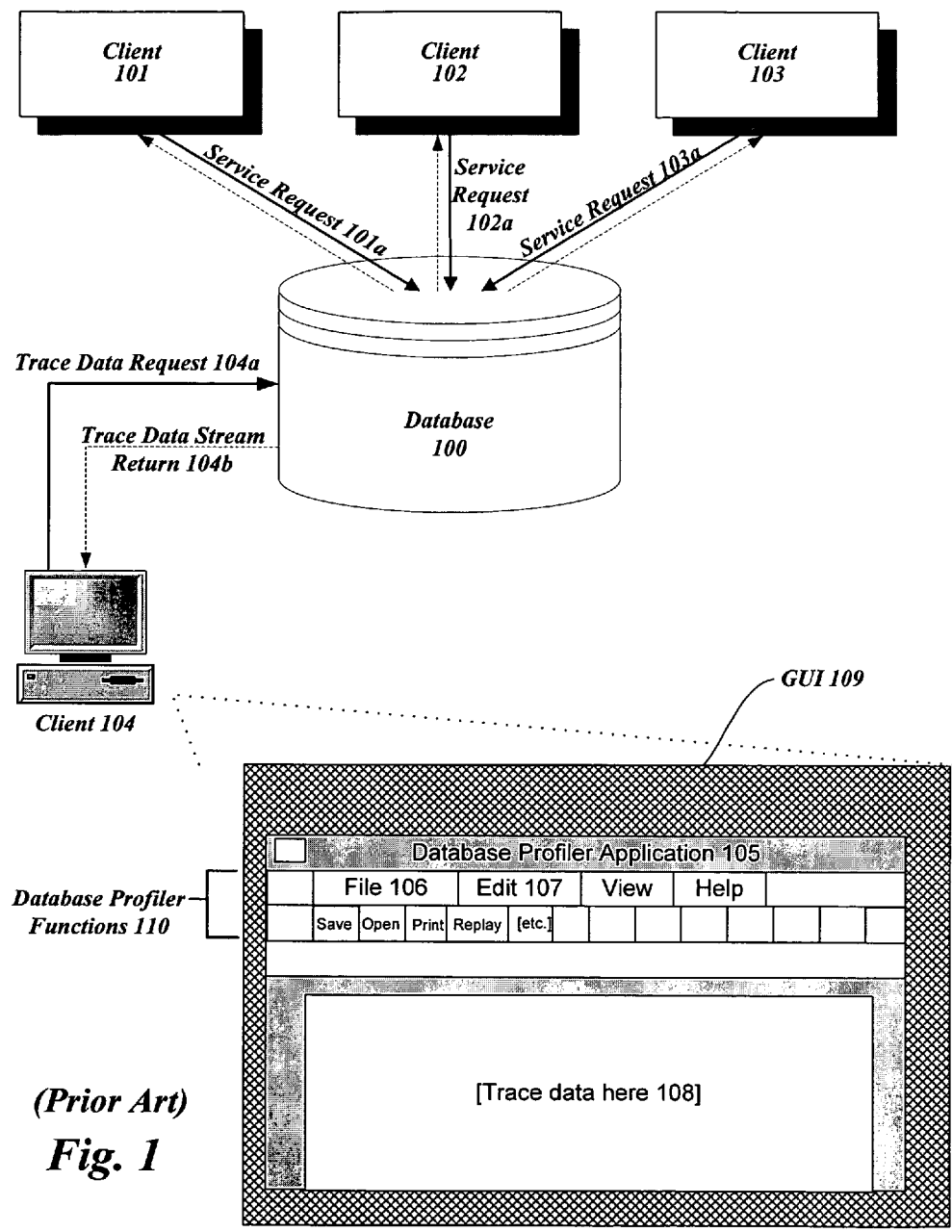
FIG. 1 illustrates a prior art system in which a profiler application can retrieve, view, store and replay database trace data reflection the various service requests of a database and/or other operations performed by the database.

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Various aspects of the invention pertain to an API for programmatic retrieval and replay of database trace data. To fully disclose these various aspects, this description will begin by defining an API, a database, and trace data. It will proceed to describe retrieval and replay of trace data. Aspects and implementations of programmatic retrieval and replay will be discussed next. Finally, a description of the general computing and network environments suitable for use with the various embodiments of the invention is provided.

An application programming interface ("API") is a computer process or mechanism that allows other processes to work together. In the familiar setting of a personal computer running an operating system and various applications such as MICROSOFT WORD® and ADOBE ACROBAT READER®, an API allows the applications to communicate with the operating system. An application makes calls to the operating system API to invoke operating system services. The actual code behind the operating system API is located in a collection of dynamic link libraries ("DLLs").

Database software can also provide an API. A database API allows processes to make calls to a database to invoke database services. Modern database software such as MICROSOFT SQL SERVERS, IBM DB2®, ORACLE DATABASE®, and SYBASE IQ®, all provide APIs. The vast majority of enterprise applications today use databases, and therefore also use the APIs that allow applications to access and manipulate those databases. It is desirable to provide these applications, whether client-side, middle-tier, or server-side applications, with the most responsive and scalable database API possible. This is especially true for data access-intensive applications. The API provided here can be incorporated into an operating system API, a database API, an API for some other application or service, or can stand alone. The functions provided here are not limited to a particular device or host software environment.

An API can be implemented, just like the operating system, application, or other software whose services are invoked, in the form of computer executable instructions. These instructions can be embodied in many different forms. Eventually, instructions are reduced to machine-readable bits for processing by a computer processor. Prior to the generation of these machine-readable bits, however, there may be many layers of functionality that convert an API implementation into various forms. For example, an API that is implemented in C++ will first appear as a series of human-readable lines of code. The API will then be compiled by compiler software into machine-readable code for execution on a processor.

Recently, the proliferation of programming languages, such as C++, and the proliferation of execution environments, such as the PC environment, the environment provided by APPLE® computers, handheld computerized devices, cell phones, and so on has brought about the need for additional layers of functionality between the original implementation of programming code, such as an API implementation, and the reduction to bits for processing on a device. Today, a computer program initially created in a high-level language such as C++ may be first converted into an intermediate language such as MICROSOFT® Intermediate Language (MSIL) or JAVA®. The intermediate language may then be compiled by a Just-in-Time (JIT) compiler immediately prior to execution in a particular environment. This allows code to be run in a wide variety of processing environments without the need to distribute multiple compiled versions. In light of the many levels at which an API can be implemented, and the continuously evolving techniques for creating, managing, and processing code, the invention is not limited to any particular programming language or execution environment. The implementation chosen for description of various aspects of the invention is that of a managed MICROSOFT® .NET class library. This choice provides a convenient environment both for practicing and describing the invention, but is in no way intended to limit the invention to this implementation.

Features of the API set forth herein provide a vehicle for automating the retrieval and replay of database trace data. Various embodiments of the contemplated systems and methods are provided in FIG. 3. Those interested in analyzing database performance can create custom objects 330, 331, 332 that can use the API 309 to gather, manipulate, and replay trace data 304b according to their individual needs. The potential operations performed by custom objects 330, 331, 332 cannot be foreseen, as they will vary with the skills and requirements of a wide number of programmers. However, the provided API 309 gives robust support for the various objects 330, 331, 332 that may be created. While the invention is not limited to the set of functions 310 disclosed in this document, the functions 310 provided are considered novel and useful both individually and as a group. These functions 310 will be explained in further detail below, in connection with the automation of retrieval and replay of trace data 304b.

Figures 11, 12:
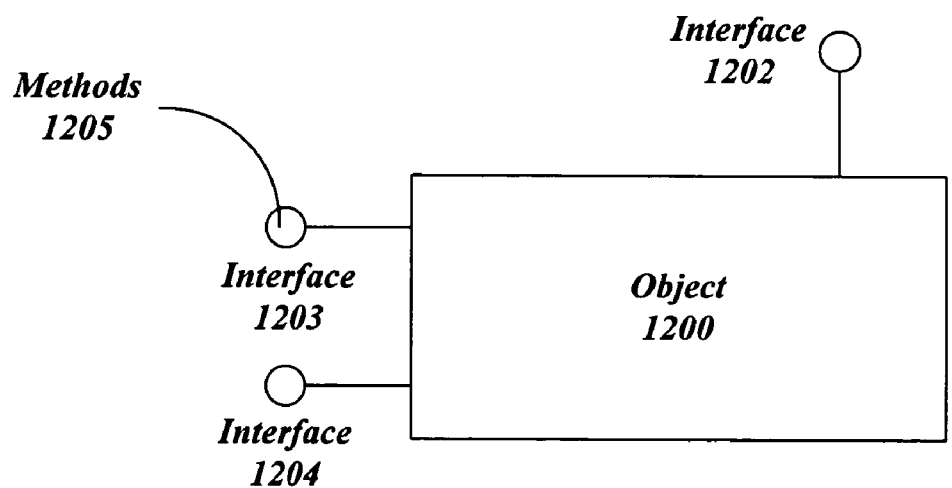
FIG. 11 displays two exemplary replay modes that can be selected from in replaying database trace data.
FIG. 12 illustrates an exemplary object for use in connection with the object-oriented coding techniques of contemplated for use with the invention.

Custom objects 330, 331, 332, and any other element identified as an object in the illustrations are discrete units of software typically generated using object-oriented programming techniques. Moreover, the API 309 itself can be implemented as one or more objects. One such exemplary object is illustrated in FIG. 12, which diagrams the features of a typical COM object 1200. Other object types are available and widely used in the industry, and the object 1200 described here is intended as a nonlimiting example for the purpose of illustration. Objects such as 1200 generally support one or more interfaces 1202, 1203, 1204, each of which includes methods 1205. A method 1205 is typically a function or a procedure that performs a specific action and can be called by software, e.g. called by another object such as 330, 331, and 332. Such calling software is referred to as the "client" of the "server" object 1200. The methods 1205 that make up an interface 1203 are usually related to each other in some way. In general, clients can access the services provided by an object 1200 by invoking the methods 1205 in the object's interfaces 1202, 1203, 1204. Clients are generally prohibited from accessing an object's data. It should be noted that functions described herein and in the claims as accomplished by an object may also be achieved through multiple objects designed to interface with each other.

Typically, an object 1200 is an instance of a specific class. One class, for example, might contain objects that provide services for opening a connection to a database server, while another class might contain objects for writing data to a file. Typically, a programmer knows an object's class prior to running an instance of that object. The class of an object is looked up in a class library. Such a library has access to a directory of all available classes of objects. A client can call a function in a library specifying the class of object it wants and the first supported interface to which it wants a pointer. The library then causes a server that implements an object of that class to start running. The library also passes back to the initiating client a pointer to the requested interface on the newly instantiated object. The client can then ask the object directly for pointers to any other interfaces the object supports.

Interfaces supported by objects are generally thought of as a contract between the object and its clients. The object promises to support the interface's methods as the interface defines them, and the clients promise to invoke the methods correctly. Thus, an object and the clients must agree on a way to explicitly identify each interface, a common way to describe, or define, the methods in an interface, and a concrete definition of how to implement an interface.

Thus, objects can be described in terms of the interface parameters that they inherit, as well as the class parameters that they inherit. Where a class of objects has a function for writing data to a file, for example, an instance that inherits the class will also be able to write data to a file, as well as any additional features and functions provided in the instance. Where a class supports a particular interface, an instance of the class inherits the "contract" and therefore also supports the interface. The objects through which aspects of the invention are implemented generally conform to these programming principles and understandings of the definitions for objects, classes, inheritance, and interfaces. However, it should be clear that modifications and improvements to object-oriented programming techniques are constantly occurring, and the invention is not limited to objects of a particular type or with any specific features. The API provided can be implemented through objects of any kind now in use or later developed.

Figure 6:
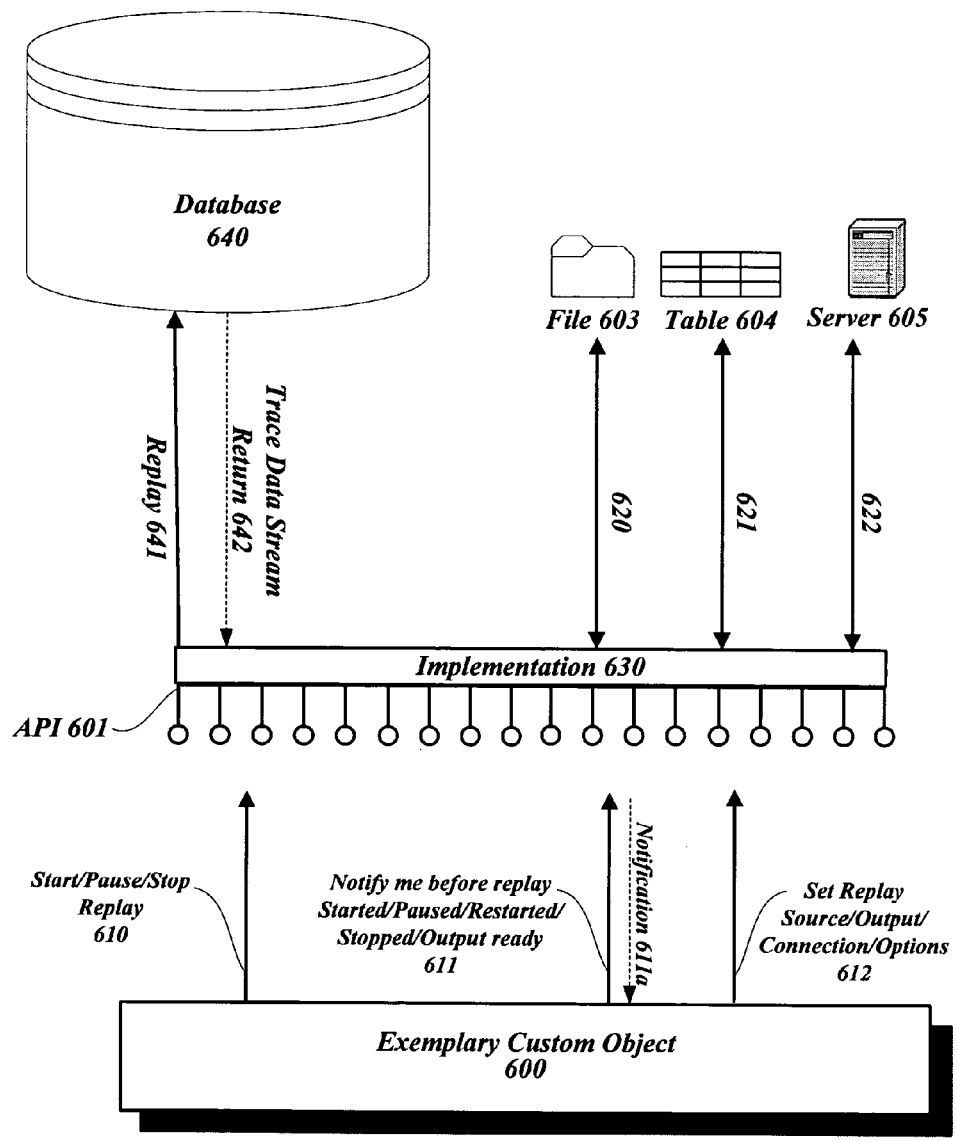
FIG. 6 illustrates various functions associated with replay of database trace data, including replay from a file, table, or server, as well as starting, stopping, and pausing replay, in addition to providing a plurality of notification options during the replay, and finally providing any additional options, such as specifying a trace source, replay mode, and other options.

A database is a collection of data, typically describing the activities of one or more related organizations. For example, a university database might contain information about entities, such as students, faculty, courses, and classrooms, and relationships between entities, such as student enrollment in courses, faculty teaching courses, and the use of rooms for courses. A database management system, or DBMS, is software designed to assist in maintaining and utilizing large collections of data. For the purpose of this document, however, the term "database," or "database server" refers to either or both of a collection of data and DBMS software. Thus, database 100 in FIG. 1, 300 in FIG. 3, and 640 in FIG. 6 illustrate database servers comprising both collections of data and DBMS. Further distinction will be made when necessary.

Many kinds of databases are in use. The first database model is widely attributed to Charles Bachman of General Electric in the early 1960's. This was called the Integrated Data Store, and followed the network data model. Later in the 1960's, IBM developed the Information Management System, which formed the basis for a hierarchical data model. In 1970, Edgar Codd of IBM proposed the relational data model, which proved to be a watershed in the development of database systems. The popularity of relational databases changed the commercial landscape. Their benefits were widely recognized, and the use of databases for managing corporate data became standard practice. While relational databases are the dominant model in use today, the various aspects of the invention are suitable for use in connection with any database presently in use or later developed that is capable of emitting trace data.

Various DBMS products, e.g. MICROSOFT SQL SERVER®, IBM DB2®, ORACLE DATABASE®, and SYBASE IQ® have greatly extended the capabilities of databases. Databases can store a wide variety of data types, such as images and text, and can perform complex queries on stored data. Specialized systems have been developed by numerous vendors for creating data warehouses, consolidating data from several databases, and for carrying out specialized analysis. All such products and database configurations are suitable for use in connection with the systems and methods herein.

Databases have entered the internet age. The use of a database to store data accessed through a web browser is widespread. Queries are generated through Web-accessible forms and answers are formatted using a markup language such as Hyper Text Markup Language (HTML) or Extensible Markup Language (XML) which can be displayed in a browser. Databases continue to gain importance as more and more data is brought online and made ever more accessible through computer networking. Today the field is being driven by exciting visions such as multimedia databases, interactive video, streaming data, digital libraries, a host of scientific projects, and corporate data consolidation and data mining. Where access to databases over global computer networks is commonplace, it should be clear that the systems and methods provided herein can be used regardless of the distance or type of connection between a client and a database.

An API for programmatic retrieval and replay of database trace data is provided. The above generally describes an API and a database. Trace data will be discussed next, followed by a discussion of retrieval and replay of trace data, followed by a discussion of programmatic retrieval and replay, which will serve to particularly point out the features of the API described generally above.

Trace data is data indicating the operations of a database. A typical database, such as 300 in FIG. 3, will be requested to perform services for any number of clients, e.g. 301, 302, 303. Such requests are generally queries formulated in Structured Query language (SQL), although as databases such as 300 grow more complex and provide a greater range of services, the types and volumes of requests also increase. Modern databases are capable of emitting a stream of trace data 304b that contains information about requests and corresponding database operations. Trace data can be useful in analyzing what a database 300 is requested to do and how the database 300 satisfies the requests. Through this analysis, databases can be improved in terms of how data is stored, how queries are managed, and in terms of the host of other services that modern databases provide.

Trace data can be emitted from a database in any format. Typically, because databases provide continuous services, trace data is emitted as a constant stream 304b of data organized according to a data transfer protocol. By opening a connection to the trace data stream 304b, a client 304 can analyze and record the operations of the database 300. In this regard, trace data 304b is typically stored in one of three locations, as suggested in FIG. 4. These locations comprise a file 403, a table 404, and a server 405. Because database trace data 304b is well understood in the industry, a detailed explanation of the precise formats for recording trace data 304 is not necessary here. It will be appreciated that trace data 304b can be recorded in any format. In general, however, formats for trace data, regardless of whether it is stored in a file 403, a table 404, or a server 405 may comprise a plurality records, or discrete units of data that convey some independent meaning.

As an example of how trace data 304b is typically divided into records, consider a typical file 403 in which trace data is stored. Such a file 403 may include the following records:

Header
2 bytes—header length
48 bytes—provider name
2 bytes—provider version
48 bytes—definition type
4 bytes—file options
48 bytes—Traced server name
Data Section Each new database event usually starts with a TRACE_BEGIN_RECORD special column followed by one byte, which represents the length of the column followed by an event identifier and overall length of the event. Then any other columns for the event are described. Each event column record may contain information corresponding to a column identifier, a data length, and the data itself. The data length is usually a single byte field.

The above provides an example of how trace data may be divided into records in a trace data file 403. Exemplary record divisions for trace data stored in a table and trace data stored in a server are not provided here, because storage of trace data in these formats is commonplace, and in general comprises dividing data into records similar to the above while varying some parameters to format the trace data in the desired layout. The above example suffices to show that trace data can be divided into any number of records, and records can be organized in any number of ways. The invention is not limited to a particular number or layout of records in a trace data file, a trace data table, or a trace data server.

Figure 3:
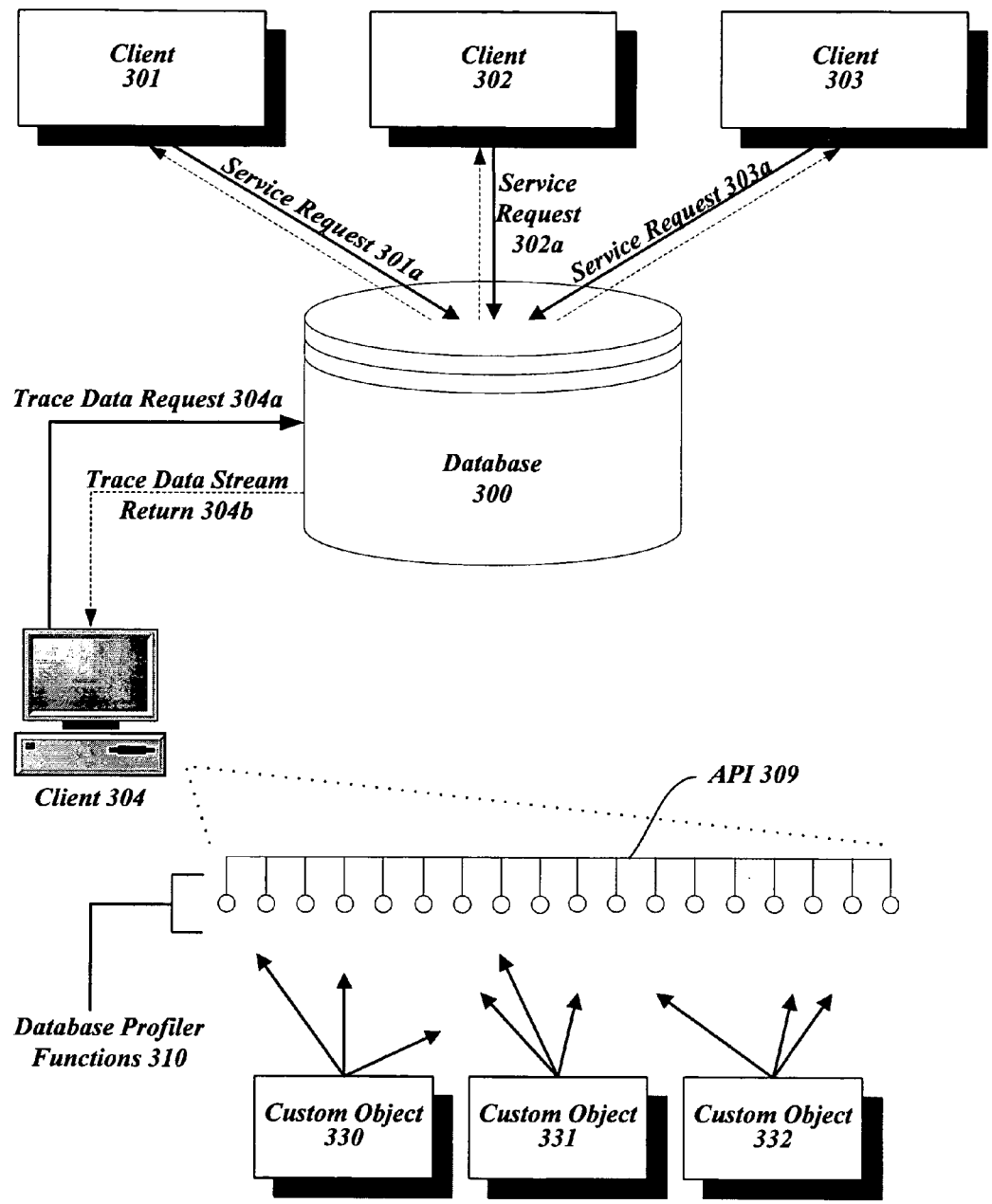
FIG. 3 illustrates an API for programmatic retrieval and replay of database trace data in which custom objects can be designed to automate the retrieval, viewing, storage, and replay of database trace data.

Retrieval of trace data refers to acquiring trace data electronically. In various embodiments of the invention, retrieval may occur in a scenario such as that of FIG. 3 in which a client 304 sends a request 304*a* for trace data to a database 300. The request 304*a* causes the database 300 or some other intermediate process (not shown) to transmit a trace data stream 304*b* to the client 304. While FIG. 3 represents a typical retrieval of trace data, It will be appreciated that any processes, or portions of processes, may run on or across any number of devices not shown, as explained with reference to the exemplary computing and networked environments below.

Figure 4:
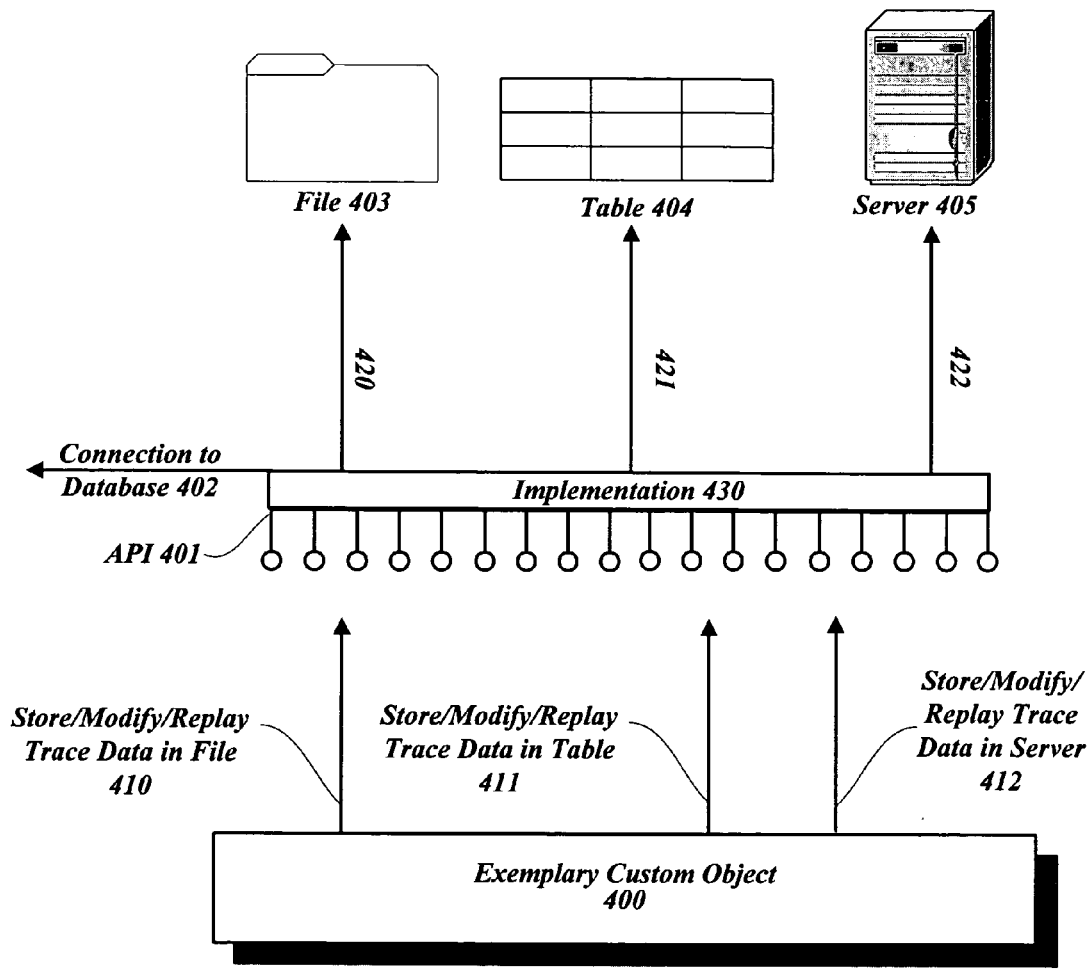
FIG. 4 illustrates various functions associated with retrieval and storage of database trace data, including storage in a file, table, and server, and requests to store, modify, and replay trace data.

Retrieval of trace data may be accompanied by storing the retrieved data, as in FIG. 4. Trace data may be stored in a file 403, a table 404, or a server 405. Note that the process of storing trace data may involve some conversion of the trace data stream from the initial signal coming from a database 300. As explained above, the trace data may be formatted into a number of records according to the particular layout and presentation of the data desired in storage. As suggested in FIG. 4, the API 401 provided allows an exemplary custom object 400 to request retrieval of trace data and to specify storage of the trace data in a file 403, table 404, or server 405. Exemplary requests 410, 411, and 412 submitted to API 401 can specify retrieval of trace data. The implementation of the API can connect to an appropriate database, retrieve the trace data stream, and write an appropriate output to 403, 404, or 405. In various embodiments, the API may be configured to automatically select a default storage location, e.g. 403, 404, or 405 to be used when no storage location is indicated by exemplary custom object 400.

Replay of trace data refers to causing a database to perform a series of operations identical to, or related to, a series of operations represented in a set of trace data. For example, consider a set of trace data stored in a file 403. Imagine that the set of trace data in question caused a database 300 to perform abnormally, e.g. by returning incorrect, abnormal, or untimely results to a client 301, or to destabilize or crash. To investigate the series of events that led to the abnormality, it may be desirable to subject the database 300 to the same conditions as those that led to the abnormality. In this situation, the appropriate set of trace data in file 403 can be used to formulate a sequence of service requests to replicate the former requests, e.g. 301*a*. Submitting such a sequence of requests amounts to replay of trace data. Note that there may be a host of reasons to replay trace data, and investigation of abnormalities is merely one example. The systems and methods herein can be used to replay trace data regardless of the purpose or intent of those who initiate such replay.

Replay of trace data need not be against the same database as the database that initially emitted the trace. Just as any database can be selected for retrieval of trace data, any database can be selected for replay. This allows a database to be used for testing purposes that is separate from a database that has real-world responsibilities. It also allows replay of trace data against a variety of database platforms and products, as desired.

Just as trace data in a file 403 can be replayed to a database 300, trace data in a table 404 or a server 405 can be replayed. Data stored in these various formats requires appropriate handling to properly format and submit the trace for replay, however identical trace data stored in any format 403, 404, 405 can be used to generate an identical replay sequence for a database 300. As shown in FIG. 4, an exemplary custom object 400 can request replay of trace data through the API 401 provided. The request can specify the trace data to replay—which may also indicate that the data is stored in file 403, table 404, or server 405, by generating requests 410, 411, 412, and the API implementation 430 can then retrieve the specified set of trace data from the file 403, table 404, or server 405 where the trace data resides and replay the trace data against a specified database.

Occasionally it is desirable to modify trace data prior to replay. For example, it may be suspected that a certain type of query is the cause of trouble. A number of additional queries of the suspect type may be added to a stored set of trace data prior to replay to test this theory. Alternatively, it may be beneficial to modify individual records of existing trace data sets. Again, there may be any number of reasons alteration of trace data is desired prior to replay and the invention is not limited to any particular intent of those making use of the API herein. Because it can be desirable to alter trace data prior to replay, the term replay as used herein refers not only to submitting an set of requests identical to those of recorded trace data, but also to submitting a set of requests related to those of recorded trace data. As suggested in FIG. 4, the API provided allows an exemplary custom object 400 to request the modification of trace data such as in requests 410, 411, and 412. The implementation 430 of the API 401 can then modify the specified trace data whether it is located in file 403, table 404, or server 405.

An API for programmatic retrieval and replay of database trace data is provided. The above generally describes an API, a database, trace data, and retrieval and replay of trace data. Systems and methods for programmatic retrieval and replay are discussed next, which will serve to particularly point out additional features of the API described generally above.

For the purpose of this application, the term programmatic refers to being accessible by automated functions. In other words, computerized instructions can be written that trigger a programmatic function with zero or reduced human involvement. For example, consider a computer user who has a bunch of numbers stored in a MICROSOFT WORD® document. The user wishes to add the numbers. One way to do this is to use a calculator application. The computer user can open a calculator application and add any numbers using a mouse device for selecting the appropriate numbers. But a calculator function does not typically expose the ability to write a computer program that programmatically retrieves and adds numbers. A user with a very large amount of numbers to add or many sets of numbers may find it onerous to use the calculator application for such a task.

Similarly, a computer user desiring to retrieve and/or replay a large amount of database trace data, or many sets of such trace data, may find it onerous to use a profiler application to do so "by hand." Instead, such a user may prefer to write a program that programmatically retrieves, stores, and replays trace data. A user can specify when to retrieve trace data, from where to retrieve it, how to store it, how to modify it, when to replay it, and so on, as described in connection with the various aspects and embodiments herein. All of these operations can be performed programmatically pursuant to the users specifications. Using the systems and methods described herein, the creation of such programs is greatly facilitated.

Figure 5:
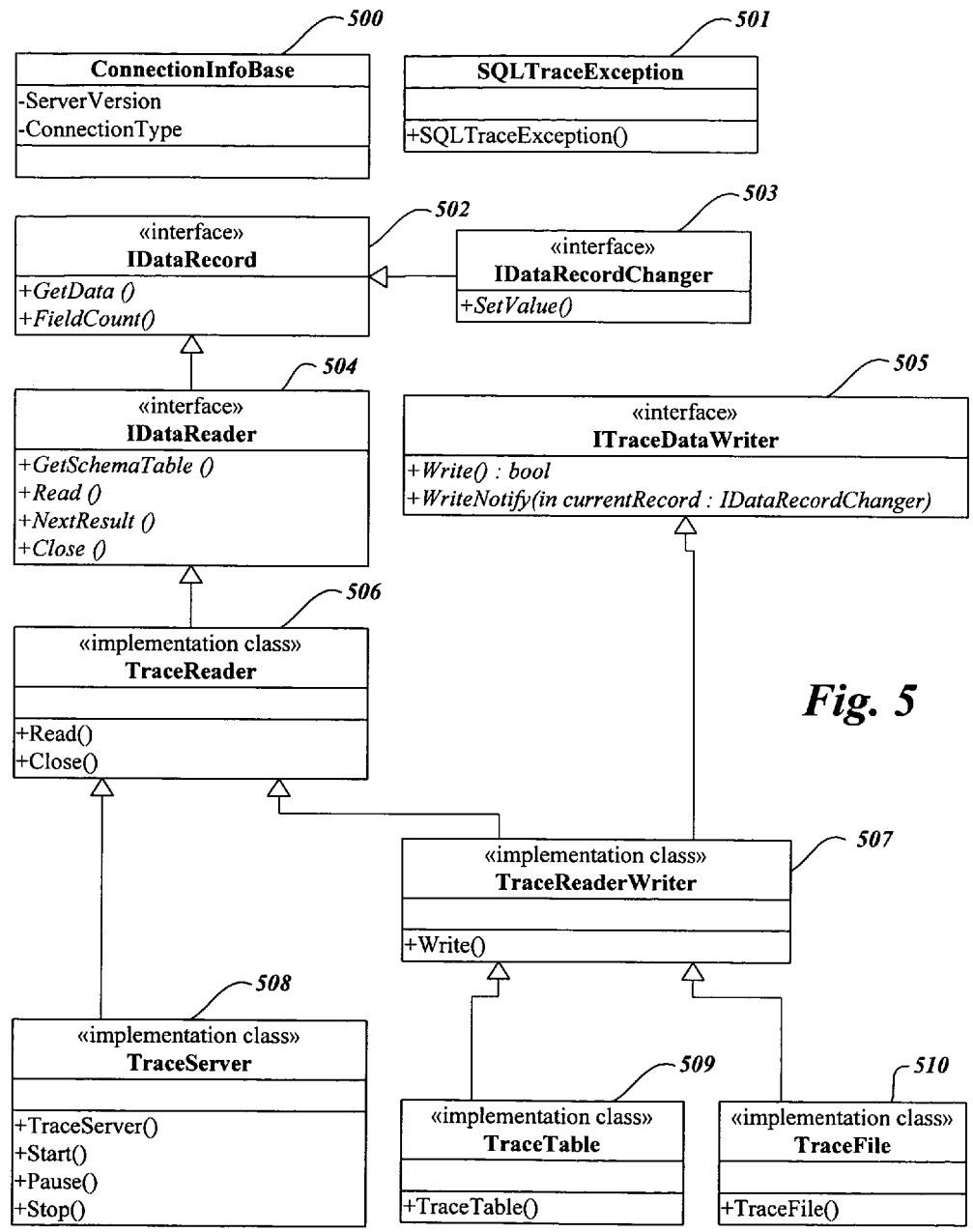
FIG. 5 provides a UML diagram for a preferred embodiment of the arrangement of the various objects implementing the API of the present invention.

Retrieval of trace data in accordance with various embodiments of the inventions is illustrated in FIG. 4 and FIG. 5. FIG. 4 points out the process and context for retrieval of trace data, while FIG. 5 illustrates an implementation of the object(s) and interface(s) used in providing the programmatic retrieval function. Retrieval in connection with FIG. 4 is discussed above, and the exemplary implementation in FIG. 5 is discussed below.

With reference to FIG. 5, a Uniform Modeling Language (UML) diagram setting forth an implementation for an API in accordance with the systems and methods herein is provided. At the top of FIG. 5, element 500 provides functions of providing connection information, such as for connecting to a server or database, to the other objects of FIG. 5. Element 501 provides functions for error reporting that can be accessed by the various other objects. Element 502 is an interface for a data record, and element 504 is an interface for retrieving data. The IDataReader interface 504 is known in the art. It is a managed interface defined in the System.Data namespace of the released with the MICROSOFT® .NET framework. The inclusion of this interface 504 in FIG. 5 is for the purpose of specifically identifying the potential functions of an exemplary API, and is not intended to limit the invention to the IDataReader 504 interface in particular.

Objects 506, 507, 508, 509, and 510 inherit from the IDataReader 504 interface. The objects 508, 509, and 510 provide the functions of retrieving trace data to a server, to a table, and to a file, respectively. Separate objects for these functions is beneficial, because a different set of operations is required in reading and writing data to a file, table or server. In the case of a server, access to trace data for modification of records is typically unavailable, so object 508 inherits directly from object 506, without also inheriting from 507, as with objects 509 and 510. Functions provided by object 508 for retrieving trace data and storing it in a file include TraceServer( ), which formats trace data for storage in a server; Start( ), which starts a retrieval of trace data from a specified server; Pause( ), which pauses a running retrieval of trace data from a specified server; and Stop( ), which stops a running retrieval of trace data from a specified server. Because object 508 inherits from object 506, 508 also provides the functions Read( ) for reading incoming data and Close( ) for closing a location in which data is stored. Further, object 508 provides the functions specified in the IDataReader interface 504. By providing these functions, object 508 allows users to access these functions programmatically and thereby automate Objects 509 and 510 are illustrated as inheriting from object 507 as well as object 506. This is for the reasons described above, namely, in preferred embodiments, it is beneficial to support record modification functions when trace data is saved to a table, as in 509, or a file, as in 510. To achieve this, object 507 inherits from 506 and provides an additional write function that can alter the records of stored trace data. As illustrated in FIG. 5, the write function conforms to an ITraceDataWriter interface 505, which sets up the requirements for writing data and for properly notifying the appropriate objects of such a write operation. Interface 505, in turn, makes use of an IDataRecordChanger interface 503 which inherits from the established IDataRecord interface 502. The IDataRecordChanger interface 503 is illustrated in another form in FIG. 9.

In the embodiment of FIG. 9, two methods are specified for the IDataRecordChanger interface. Those of skill will acknowledge that different or additional methods may be specified in such an interface without changing the fundamental operation of the invention. The purpose of the interface as illustrated in FIG. 9 is to provide a means to change data as data is being written or replayed. In this regard, method SetValue( )can takes an index of a column to be replaced (int i) and places a new value (object value) in that location. Method AddColumn( ), on the other hand, adds a new column to trace data. In this regard, a column identifier (int columnid) is provided to such a method as an argument, and an index for the newly generated column can be returned.

Thus, the use of an interface 503 to specify the requirements for changing trace data records delivered according to another interface 502 ultimately allows objects 509 and 510 to perform record modification operations. Such record modification is useful for the purpose of replay. When used in connection with the automated replay techniques provided herein, it allows for on the fly modification and replay of trace data to provide high-powered database analysis never before achieved.

All of the functions inherited by objects 509 and 510 are accessible programmatically by users, e.g. by exemplary custom object 400. Thus, while objects 509 and 510 are capable of writing trace data from a database stream to a table or file, respectively, as indicated by the TraceTable( ) and Trace File( ) notations in the UML diagram, by virtue of their inheritance from object 507 they also support modification of the records stored in tables and files. Further, by virtue of the inheritance from object 506, functions of reading database trace streams and closing connections to database trace streams are also supported by objects 509 and 510. Those who understand UML diagrams will appreciate this, and will further recognize the IDataReader interface 504 and the corresponding exemplary functions inherited from that interface.

Moving now to embodiments of the invention that support programmatic replay of database trace data, refer to FIG. 6, FIG. 7, FIG. 8, FIG. 9, FIG. 10, and FIG. 11. FIG. 6 provides a diagram that schematically illustrates the various operations that may be performed via an API that allows for programmatic replay of trace data. FIG. 7 through FIG. 11 provide information about the various calls that can be exposed to access replay functions. Note that a UML diagram is not provided here because such a diagram would not be interesting or informative. This is because, in a preferred embodiment, the replay function objects need not inherit from any preexisting objects. That said, implementations of the invention which utilize inheritance could certainly be devised.

Turning to FIG. 6, again an exemplary custom object 600 is provided that can make various function calls 610, 611, 612 to an API 601. The API 601 can be supported by an implementation 630 for carrying out the various operations that are requested of the API 601. The implementation 630 may utilize the various object oriented design principles discussed herein, such as with reference to FIG. 12. In carrying out the requested functions, the API implementation 630 may access and or modify trace data stored in a file 603, trace data stored in a table 604, and trace data stored in a server 605. The implementation 630 may also formulate and send a series of queries or other communications, related to trace data in 602, 604, and 605 to a database 640. The implementation may concurrently retrieve the trace data stream return 642 for the purpose of again storing such data in 603, 604, or 605 for further analysis.

The API may expose the ability to start, pause, or stop replay of trace data 610. These features are also demonstrated in FIG. 7 which provides pseudo code definition for a trace replay class of objects. A custom object 600 that makes a call such as those provided in FIG. 7 can specify a start operation for starting a replay, along with any number of start parameters. Such parameters might specify the location of the trace to be replayed, the time of replay, the database for the replay, and so on. Similarly, pause and stop functions, as shown in FIG. 7, may be accessed by exemplary custom object 600.

The API may also expose the ability to request a notification 611 upon the occurrence of any number of events. Such notifications can be used by custom object 600 for further useful advantage in replaying trace data. These custom notifications are also illustrated in FIG. 7. For example, custom object 600 might request notification prior to starting a replay. This is shown also by the "event ReplayNotifyDelegate . . . " line in FIG. 7. This feature allows custom object 600 to, for example, examine trace data just before replay, and make any changes to the various records as desired. Similarly, notifications may be requested when replay is paused, as indicated in FIG. 7 by the "event ReplayPauseDelegate ReplayPauseNotify" line. Notifications may be requested when replay is restarted, as indicated in FIG. 7 by the "event ReplayPauseDelegate ReplayStartNotify, or when the trace data replay is stopped, as indicated in FIG. 7 by the "event ReplayStopDelegate ReplayStopNotify" line. Notifications may be requested when trace data output from a particular replay is ready, as indicated in FIG. 7 by the "event ReplayOutputNotifyDelegate ReplayOutputNotify" line. Conversely, custom object 600 may not make a request for notification 611, and may simply choose to ignore these events.

The ways in which these notifications 611 may be used by custom object 600 to coordinate the modification and replay of trace data are unlimited. The scope of this patent extends to the use of the API disclosed, and to objects that make use of the API, regardless of whether those objects also include additional features beyond the scope of the invention. The notion of providing notifications via an API for replaying trace data as disclosed herein is an advancement in itself that will support flexible, powerful design of custom objects making use of the provided API.

The notification 611*a* in FIG. 6 represents the notification signal from the API 601 to the custom object. It will be appreciated that any form of notification known in the art may be used, such as event objects or .NET delegates, as suggested by the language of FIG. 7. In various preferred embodiments, where a .NET delegate is used for callback notification, the notification events may be declared as illustrated in FIG. 8. The example here may be extended to other embodiments, with minor implementation differences. As shown in FIG. 8, the ReplayNotifyDelegate may declare the data pertaining to the subject notification. This is also true of the other exemplary notification events.

The notification events illustrated in FIG. 8 are designed to carry sufficient information to allow for an event handler to intelligently choose appropriate actions in response to the notifications. These notifications may also comprise mechanisms to influence the execution of Replay. In this regard, the following exemplary information can be included with notification events such as those of FIG. 8:

RecordNumber—can specify a row number of a trace record to be replayed.

currentRecord—can be a trace record currently being replayed. A custom object could examine the columns of such a record, and modify it directly.

skipRecord—by setting a skip record flag to "true," a custom object handler could ask the API not to replay a particular trace record.

The additional features illustrated in FIG. 7 are, first, a function identified here as a "TraceReaderWriter Output" function. As implied by the language used, this allows a custom object 600 to retrieve the trace data output that is emitted by a database as a result of a replay. Such output data may be modified prior to storage. A "ConnectionInfoBase Connection" function allows a custom object to specify information pertaining to connecting to a database or other appropriate server. For instance, a particular database address and communications protocol might be specified. The API can then programmatically open a connection to the specified database at such time as required by a custom object 600.

Finally with respect to FIG. 7, the "TraceReplayOptions" function allows custom object 600 to specify any number of additional options. Exemplary options that might be made available in a preferred API are illustrated in FIG. 10. The object that provides the options for the trace data API can provide any of the illustrated five options as well as any other options that may be devised or found to be useful. A size of a replay thread pool can be controlled. This option can be utilized to prevent replay from opening too many threads and overburdening system resources. A wait time can be specified prior to "killing" or terminating a hung process. For instance, if a connection to a database is not properly executing, that process can be given a specified amount of time before termination. A frequency of polling for hung processes can be set. This allows a user to specify how much system resources should be devoted to polling. In very stable environments, it is likely that less frequent polling is desired. A replay mode can be specified. This option is further illustrated in FIG. 11. Two modes are contemplated herein. First, a sequential replay mode, in which trace data is replayed to a database in the same order it was collected in a trace data storage area. Second, a "connection level synchronized" mode, in which all events pertaining to a particular client are replayed sequentially, but any global sequence of events is not preserved, i.e. client requests are assumed to be independent of each other. For example, if a single client generated one-tenth of the requests for particular database, an aspect of the invention allows that same one-tenth of database requests to be replayed sequentially against a database. As with the other functions herein that can be accessed programmatically, this allows for flexible control of the details of replay.

Finally, referring back to FIG. 10, an object may specify whether actual database query results should be returned, or simply the results for operations that generated errors. This option highlights a useful aspect of the invention, namely that in addition to trace data, the actual results—query results or errors—can be collected during replay, and this feature can, moreover, be controlled by an object that provides for control of replay options.

Thus the API and the various supporting objects disclosed herein greatly simplify the management of trace data from several perspectives. First, they enable user to completely automate security audit and health monitoring of traced server. Second, they allow for automatic functional verification of new server releases and security packs.

Exemplary Computing and Network Environment

Figure 2A:
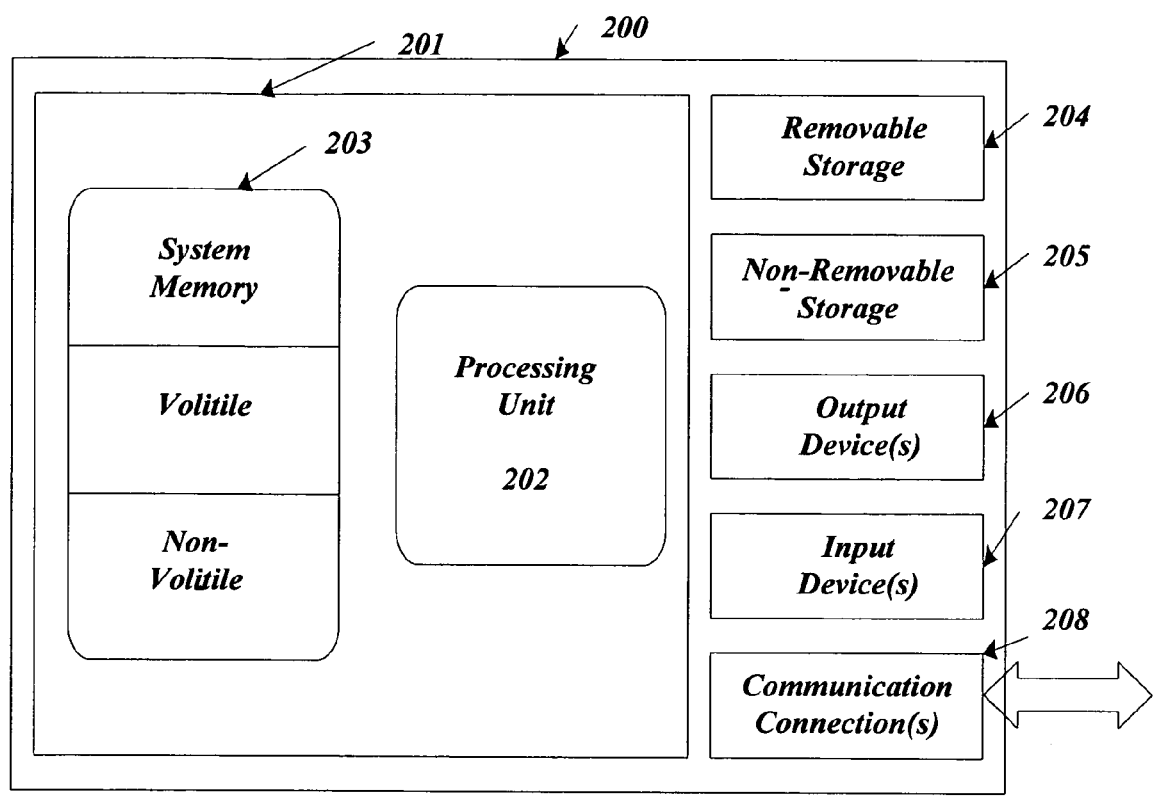
FIG. 2a is a block diagram broadly representing the basic features of an exemplary computing device suitable for use in conjunction with various aspects of the invention.

With reference to FIG. 2*a*, an exemplary computing device 200 suitable for use in connection with the systems and methods of the invention is broadly described. In its most basic configuration, device 200 typically includes a processing unit 202 and memory 203. Depending on the exact configuration and type of computing device, memory 203 may be volatile (such as RAM), non-volatile (such as ROM, flash memory, etc.) or some combination of the two. Additionally, device 200 may also have mass storage (removable 204 and/or non-removable 205) such as magnetic or optical disks or tape. Similarly, device 200 may also have input devices 207 such as a keyboard and mouse, and/or output devices 206 such as a display that presents a GUI as a graphical aid accessing the functions of the computing device 200. Other aspects of device 200 may include communication connections 208 to other devices, computers, networks, servers, etc. using either wired or wireless media. All these devices are well known in the art and need not be discussed at length here.

Figure 2B:
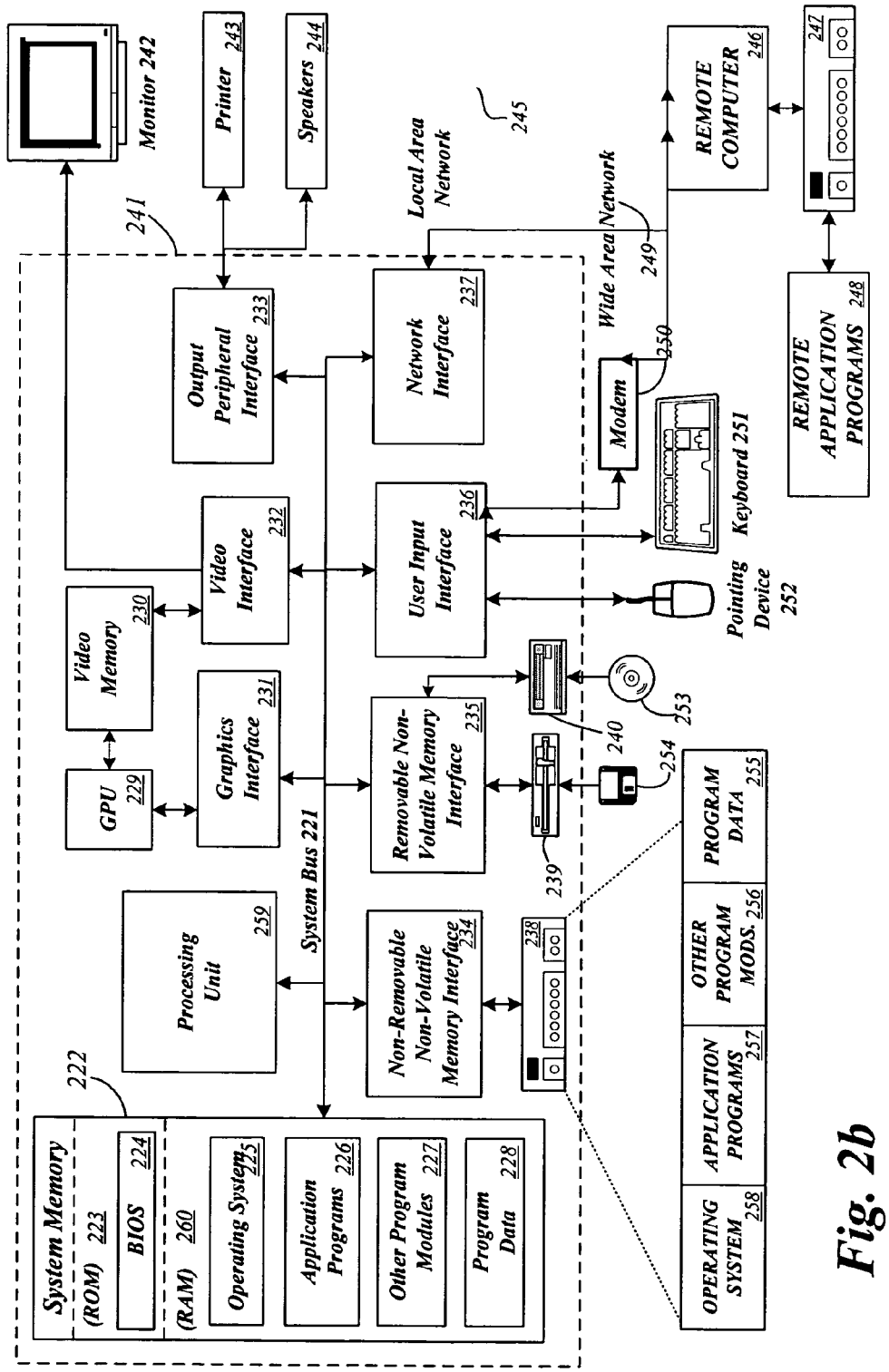
FIG. 2b is a block diagram representing a more detailed exemplary computing device suitable for use in conjunction with various aspects of the invention.

FIG. 2*b* illustrates a somewhat more detailed example of a suitable computing device from FIG. 2*a* and peripheral systems. The computing system environment 220 is only one example of a suitable computing environment and is not intended to suggest any limitation as to the scope of use or functionality of the invention. Neither should the computing environment 220 be interpreted as having any dependency or requirement relating to any one or combination of components illustrated in the exemplary operating environment 220.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be implemented in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 2*b*, an exemplary system for implementing the invention includes a general purpose computing device in the form of a computer 241. Components of computer 241 may include, but are not limited to, a processing unit 259, a system memory 222, and a system bus 221 that couples various system components including the system memory to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 241 typically includes a variety of computer readable media. Computer readable media can be any available media that can be accessed by computer 241 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during startup, is typically stored in ROM 223. RAM 260 typically contains data and/or program modules that are immediately accessible to and/or presently being operated on by processing unit 259. By way of example, and not limitation, FIG. 2*b* illustrates operating system 225, application programs 226, other program modules 227, and program data 228.

The computer 241 may also include other removable/non-removable, volatile/nonvolatile computer storage media. By way of example only, FIG. 2*b* illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 2*b*, provide storage of computer readable instructions, data structures, program modules and other data for the computer 241. In FIG. 2*b*, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 2b. The logical connections depicted in FIG. 2b include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 2b illustrates remote application programs 248 as residing on memory device 247. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments refer to utilizing the present invention in the context of one or more stand-alone computer systems, the invention is not so limited, but rather may be implemented in connection with any computing environment, such as a network or distributed computing environment. Still further, the present invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

Figure 2C:
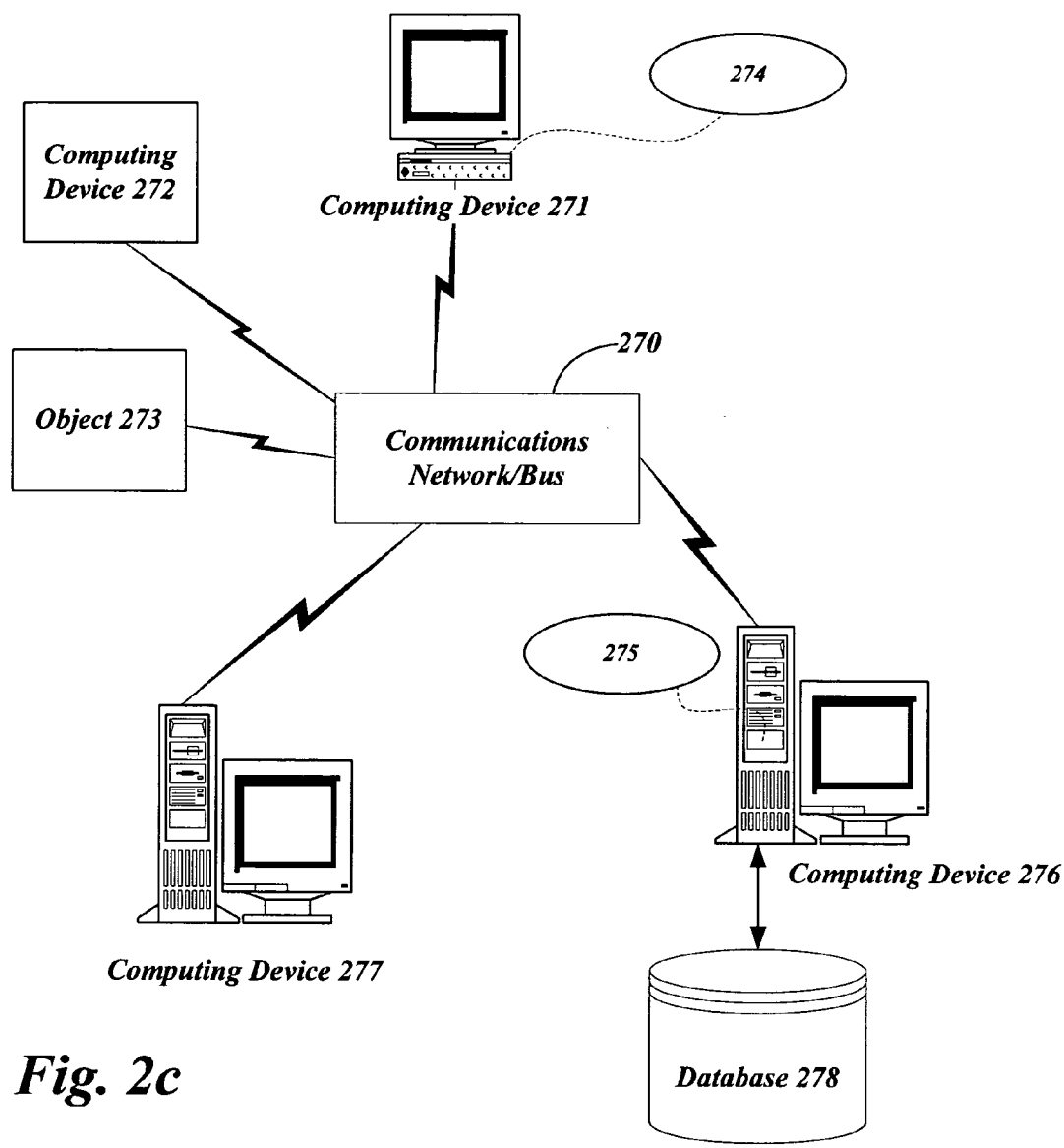
FIG. 2c illustrates an exemplary networked computing environment in which may computerized processes, including those of the invention, may be implemented.

An exemplary networked computing environment is provided in FIG. 2c. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 2c provides a schematic diagram of an exemplary networked or distributed computing environment. The environment comprises computing devices 271, 272, 276, and 277 as well as objects 273, 274, and 275, and database 278. Each of these components 271, 272, 273, 274, 275, 276, 277 and 278 may comprise or make use of programs, methods, data stores, programmable logic, etc. The components 271, 272, 273, 274, 275, 276, 277 and 278 may span portions of the same or different devices such as PDAs, audio/video devices, MP3 players, personal computers, etc. Each component 271, 272, 273, 274, 275, 276, 277 and 278 can communicate with another component 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 2c, and may itself represent multiple interconnected networks. In accordance with an aspect of the invention, each component 271, 272, 273, 274, 275, 276, 277 and 278 may contain discrete functional program modules that might make use of an API, or other object, software, firmware and/or hardware, to request services of one or more of the other components 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2c, any component 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework of provided in FIG. 2a and FIG. 2b, and the further diversification that can occur in computing in a network environment such as that of FIG. 2c, the systems and methods provided herein cannot be construed as limited in any way to a particular computing architecture. Instead, the present invention should not be limited to any single embodiment, but rather should be construed in breadth and scope in accordance with the appended claims.

What is claimed:

1. A system for supporting programmatic retrieval and replay of database trace data, said system comprising a processor configured to carry out instructions stored on computer readable media, said instructions comprising:

instructions for a first functional element for retrieving database trace data;

instructions for a first exposed function call whereby custom computer processes can programmatically initiate the operation of said first functional element;

instructions for a second functional element for storing database trace data;

instructions for a third functional element for replaying database trace data; and instructions for a third exposed function call whereby custom computer processes can programmatically initiate the operation of said third functional element.

2. The system of claim 1, wherein said instructions for second functional element comprises instructions for storing database trace data one or more of a file, a table, and a server.

3. The system of claim 1, further comprising instructions for a fourth functional element for modifying stored database trace data.

4. The system of claim 3, further comprising instructions for a fourth exposed function call whereby custom computer processes can programmatically initiate the operation of said fourth functional element.

5. The system of claim 1, wherein said first functional element comprises one or more objects that inherit from an IDataReader interface.

6. The system of claim 1, wherein said instructions for a third functional element comprise instructions for notifying a custom computer process prior to replaying trace data.

7. The system of claim 1, wherein said instructions for a third functional element comprise instructions for notifying a custom computer process when database output from a replay is available for a custom computer process.

8. The system of claim 1, wherein said instructions for a third functional element comprise instructions for notifying a custom computer process when a replay is stopped.

9. The system of claim 1, wherein said instructions for a third functional element comprise instructions for a sequential replay mode in which substantially all database service requests for a particular database are replayed.

10. The system of claim 1, wherein said instructions for a third functional element comprise instructions for a connection level replay mode in which substantially all database service requests sent to a database from an identified client or set of clients are replayed.

11. The system of claim 1, wherein said instructions for a third functional element comprise instructions for gathering substantially all database output associated with a replay.

12. The system of claim 1, wherein said instructions for a third functional element comprise instructions for gathering substantially only reported database errors associated with a replay.

* * * * *